United States Patent Office 3,575,878
Patented Apr. 20, 1971

3,575,878
PROCESS FOR RECLAIMING PHOSPHORS
Emil J. Mehalchick, Towanda, and Henry B. Minnier, Dushore, Pa., assignors to Sylvania Electric Products Inc.
No Drawing. Filed Apr. 21, 1969, Ser. No. 818,089
Int. Cl. C09k 1/10
U.S. Cl. 252—301.4    5 Claims

ABSTRACT OF THE DISCLOSURE

A process for recovering a rare earth oxide phosphor usable form from a material containing a rare earth oxide contaminated with sulfide phosphors selected from the group consisting of zinc sulfide, zinc cadmium sulfide and mixtures thereof is disclosed. The process enables the recovery without destroying the oxide form and comprises forming a relatively uniform mixture consisting essentially of the contaminated material and an amount of ammonium halide stoichiometrically equivalent to the amount of the sulfide phosphor present in the contaminated material and heat treating the relatively uniform mixture at a temperature of at least 1000° C. and for a time sufficient to remove said sulfides.

BACKGROUND OF THE INVENTION

This invention relates to reclaiming rare earth oxide phosphors. More particularly it relates to recovering rare earth oxide phosphors from phosphor compositions that are contaminated with sulfide phosphors such as zinc sulfide, zinc cadmium sulfide and mixtures thereof.

The rare earth oxide phosphors such as yttrium oxide, gadolinium oxide and mixed yttrium gadolinium oxide, are extremely bright phosphors. One deterrent to their wide acceptance in commercial color television cathode ray tubes has been the inability to recover the rare earth oxide as a phosphor when they became contaminated. Previously known recovery techniques generally involved dissolving the rare earth values, selectively recovering the values as water insoluble salts such as oxalates and thereafter converting the recovered salts to oxides. While these methods do produce an acceptable phosphor, it is believed apparent that such methods add an appreciable amount to the overall production cost of the phosphor. The present widely used red-emitting phosphor, yttrium orthovanadate has heretofore offered the advantage of being recovered as a phosphor per se, as opposed to breaking down the phosphor to its elements and then recovering such values and subsequent conversion to the phosphor.

In the screens used in color television picture tubes, the phosphors selectively emit red, green and blue light upon excitation from cathode rays. The three phosphors are deposited on the screen individually, generally as dots. Thus, in the manufacture of the foregoing tubes, if a rare earth oxide is utilized as the red-emitting phosphor, at least some of the red-emitting phosphor is contaminated with the blue or the green phosphors, or both. The commonly used blue-emitting phosphors are the zinc sulfides activated with silver. The commonly used green-emitting phosphors are the zinc cadmium sulfides. In many instances a rare earth oxide phosphor that is used as the red-emitting phosphors, can become contaminated with the foregoing sulfide phosphors and must be processed in a manner to remove the sulfides before it can be reused. Since the rare earths are relatively expensive, recovery of these values is essential.

It is believed, therefore, that a process that will recover rare earth oxide phosphors that are essentially equivalent in brightness to virgin phosphors from a material containing rare earth oxide phosphors and at least one of the foregoing sulfide phosphors, would be an advancement in the art.

SUMMARY OF THE INVENTION

In accordance with one aspect of this invention, there is provided a process for recovering a rare earth oxide phosphor from a material containing a rare earth oxide phosphor and at least one sulfide phosphor selected from the group consisting of zinc sulfide, zinc cadmium sulfide and mixtures thereof, said process comprising: forming a relatively uniform mixture of the contaminated rare earth oxide phosphor material and an amount of ammonium halide that is at least stoichiometrically equivalent to the amount of sulfide present in the contaminated material and heat treating said mixture at a temperature of at least about 1000° C. for a time sufficient to effect the removal of contaminants, thereby providing a phosphor having essentially the same brightness as a virgin rare earth oxide phosphor.

For a better understanding of the present invention, together with other and further objects, advantages and capabilities thereof, reference is made to the following disclosure and appended claims in connection with the above summary of the invention.

DESCRIPTION OF THE PREFERRED EMBODIMENTS

As previously mentioned, the ammonium halides have been found to be effective to enable the removal of the contaminating sulfides. It is believed that during the heat treating step that the ammonium halides decompose and that the decomposition products react with the metal cations of the sulfides, e.g. zinc and cadmium, to form volatile reaction products. It has been found that the presence of at least a stoichiometric amount of an ammonium halide is necessary to achieve the removal of the sulfide contaminants. Heating the contaminated rare earth oxide phosphor material to the same temperature without the presence of the ammonium halides does not achieve any appreciable reduction in the sulfide contamination and hence the original brightness is not achieved. In general, the amount of ammonium halide required is at least a stoichiometric amount based upon the amount of sulfide contaminate that is present in the contaminated rare earth oxide phosphor, that is, at least 2 moles of ammonium halide are required for each mole of sulfide that is present. Amounts of ammonium halide in excess of the stoichiometric equivalent amount can be used satisfactorily since the ammonium halides decompose to form volatile products under the temperatures used in heat treating the mixture containing the ammonium halide. In most instances, excess amounts from about 50% to about 100% molar are used to insure relatively complete removal of the sulfide contaminants.

Although any of the ammonium halides can be used, such as ammonium fluoride, chloride, iodide and the like, it is preferred to use ammonium chloride, primarily because trace amounts of ammonium chloride can be present in the phosphors without any adverse effects. Trace amounts of other halides can cause adverse effects in some applications for phosphors, therefore when the ammonium halides other than ammonium chloride are used and trace amounts of these halides can cause problems in the end use of the phosphor, it is preferred to wash the phosphor after firing with an aqueous wash and reheat to about 1100° C. for about 60 minutes to insure that the halides are removed.

Any conventional means can be used to effectively distribute the ammonium halide through the contaminated material. The particular method chosen will be dependent upon several factors including the amount of ammonium halide that is to be used, the availability of equipment and the amount of sulfide present in the phosphor. In most instances, conventional equipment used to mix solids will be used, such as ribbon mixers, blenders and the like. If desired, however, an aqueous medium containing ammonium halide can be sprayed onto a bed of the contaminated material. However, since the water has to be evaporated, use of such aqueous media for dispensing the ammonium halides is not preferred.

It is necessary in the practice of this invention to heat the mixture containing the contaminated phosphor and the ammonium halide to at least 1000° C. to effect the removal of the sulfides. The time required for the removal will depend upon the amount of contamination present and the temperature used. In most instances at least about 30 minutes will be required if the sulfides are at levels above about 0.5% by weight. It has been found that at levels of sulfides up to about 5% by weight of the total weight of the contaminated material, heating at about 1200° C. for about 2 hours yields phosphors that are equivalent in brightness to rare earth phosphors prepared from virgin rare earths. As previously mentioned, however, lower temperatures, that is at least about 1000° C. can be used. However, the time required for removal of the sulfides will be increased. Higher temperatures can be used, however, temperatures appreciably above about 1400° C. do not beneficially improve the process or the material produced, therefore, are not preferred because of the additional cost involved without any appreciably corresponding benefits. In any event, the determination of the complete removal of the sulfide can be determined by sampling the mixture and running sulfide content of the sample using analytical means known to those skilled in the art of analytical chemistry.

It is to be noted that, in general, rare earth phosphors containing any level of a contaminant selected from the group consisting of zinc sulfide, zinc cadmium sulfide, and mixtures thereof can be treated by the process of this invention, however, as a practical economic matter, materials containing high levels of sulfide contamination, that is above about 50% by weight of the total contaminated phosphor material, are not generally recovered in this manner because it is more economical to either dissolve the contaminated material and precipitate the rare earth values or preferentially dissolve the rare earth values.

The rare earth oxide phosphors that can be processed are any of the lanthanide series of rare earths and yttrium. As used herein, the term rare earth oxide is used to include yttrium since it behaves similarly to other rare earths of the lanthanide series. In most instances, the europium-activated yttrium oxide and europium-activated gadolinium oxide and the europium-activated mixed gadolinium yttrium oxide will be reclaimed by the process of this invention since they are the bright red-emitting phosphors that are known to be useful in color television cathode ray tubes, although any material containing a rare earth oxide phosphor contaminated with sulfides can be reclaimed by the process of this invention. The rare earth oxides are inert to the presence of the ammonium halides, therefore, the operability of the process of this invention is not dependent upon the type of rare earth oxide phosphor.

To further illustrate the subject invention, the following detailed examples are presented. All parts, proportions and percentages are by weight unless otherwise indicated.

EXAMPLE I

About 4.4 parts of ammonium chloride are intimately mixed with about 104 parts of a mixture containing about 100 parts of europium-activated gadolinium oxide, about 2 parts of silver-activated zinc sulfide and about 2 parts of silver-activated zinc cadmium sulfide. The mixture is heated to about 2150° F. for about 2 hours in an oxidizing atmosphere. Samples of the material after the heating indicate that essentially all of the contaminants have been evolved and the brightness of the resulting phosphor under cathode ray excitation is equivalent to europium-activated gadolinium oxide prepared from virgin gadolinium and europium via the conversion of oxalates to oxides.

Substantially identical results are achieved when a contaminated europium-activated yttrium oxide is reclaimed using essentially the process and equivalent amounts of ammonium chloride.

The following table gives the results of tests of samples of materials reclaimed by the process of this invention compared with similar phosphor prepared from virgin materials. The results are given in terms of percent brightness as compared with a standard yttrium orthovanadate phosphor taken as 100. The brightness is also expressed in terms of foot lamberts.

TABLE I

| Sample No. | Description of sample | Foot-lamberts | Relative Crt. Bri., percent | Percent ZnS:Ag | Percent ZnCdS:Ag |
|---|---|---|---|---|---|
| A | Standard | 11.0 | 100 | | |
| B | Control (Y$_2$O$_3$:Eu) | 16.6 | 151 | | |
| C | Untreated | 15.4 | 140 | 2.0 | 2.0 |
| D | Treated | 16.6 | 151 | | |
| E | Untreated | 15.9 | 145 | 1.0 | 1.0 |
| F | Treated | 16.6 | 151 | | |

It can be seen that in both instances that the treated phosphor Samples D and F have essentially the same brightness as the phosphor prepared from virgin material, Sample B. Substantially similar results are obtained when gadolinium oxide phosphors and mixed yttrium-gadolinium oxide phosphors are treated by the process of this invention.

While there has been shown and described what is at present considered the preferred embodiments of the invention, it will be obvious to those skilled in the art that various changes and modifications may be made therein without departing from the scope of the invention as defined by the appended claims.

What is claimed is:
1. A process for recovering a rare earth oxide phosphor from a contaminated material containing a rare earth oxide and contaminated with a sulfide phosphor selected from the group consisting of zinc sulfide, zinc cadmium sulfide and mixtures thereof, comprising:
    (a) forming a relatively uniform mixture of said contaminated material and at least a stoichiometric amount of an ammonium halide based upon the amount of sulfide present in said contaminated material, and
    (b) heating said mixture to a temperature of at least about 1000° C. for a time sufficient to remove said sulfide.

2. A process according to claim 1 wherein said ammonium halide is ammonium chloride.

3. A process according to claim 2 wherein said sulfide level is above about 0.5%.

4. A process according to claim 3 wherein said temperature is from about 1000° C. to about 1400° C. and said mixture is heated for at least about 30 minutes.

5. A process according to claim 4 wherein said rare earth oxide is selected from the group consisting of europium-activated yttrium oxide, europium-activated gadolinium oxide and europium-acitvated gadolinium-yttrium oxide.

References Cited
UNITED STATES PATENTS

| | | | |
|---|---|---|---|
| 3,203,899 | 8/1965 | Fisher | 252—301.4 |
| 3,492,241 | 1/1970 | LaTulip et al. | 252—301.4 |

TOBIAS E. LEVOW, Primary Examiner

R. D. EDMONDS, Assistant Examiner